United States Patent
Sivaswamy et al.

(10) Patent No.: US 12,309,122 B2
(45) Date of Patent: May 20, 2025

(54) DYNAMIC VIRTUAL PRIVATE NETWORK PROTOCOL CONFIGURATION

(71) Applicant: International Business Machines Corporation, Armonk, NY (US)

(72) Inventors: Hemant Kumar Sivaswamy, Pune (IN); Venkata Vara Prasad Karri, Visakhapatnam (IN); Sarbajit K. Rakshit, Kolkata (IN); Seema Nagar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 17/453,090

(22) Filed: Nov. 1, 2021

(65) Prior Publication Data
US 2023/0139329 A1    May 4, 2023

(51) Int. Cl.
*H04L 9/40* (2022.01)
*G06N 20/00* (2019.01)
*H04L 41/0813* (2022.01)
*H04L 41/0894* (2022.01)
*H04L 41/0895* (2022.01)

(52) U.S. Cl.
CPC ......... *H04L 63/0272* (2013.01); *G06N 20/00* (2019.01); *H04L 41/0813* (2013.01); *H04L 41/0894* (2022.05); *H04L 41/0895* (2022.05); *H04L 63/029* (2013.01); *H04L 63/083* (2013.01); *H04L 63/16* (2013.01)

(58) Field of Classification Search
CPC ............... H04L 63/0272; H04L 63/029; H04L 63/083; H04L 63/16; H04L 41/0813; H04L 41/0894; H04L 41/0895; G06N 20/00
See application file for complete search history.

(56) References Cited

U.S. PATENT DOCUMENTS

| | | | |
|---|---|---|---|
| 6,473,863 B1 | 10/2002 | Genty et al. | |
| 8,516,569 B2 | 8/2013 | Babula et al. | |
| 10,187,321 B2 | 1/2019 | Maino et al. | |
| 10,505,904 B2 | 12/2019 | Hoy et al. | |
| 11,757,841 B2* | 9/2023 | Žaliauskas | H04L 41/08 726/15 |
| 2007/0074283 A1* | 3/2007 | Croak | H04L 63/164 726/15 |

(Continued)

OTHER PUBLICATIONS

"Dynamic VPN Routing," https://docs.appian.com/suite/help/20.3/Dynamic_VPN_Routing.html, printed Aug. 27, 2021, 3 pgs.

(Continued)

*Primary Examiner* — Boris D Grijalva Lobos
(74) *Attorney, Agent, or Firm* — Anthony M. Pallone

(57) ABSTRACT

Provided is a computer-implemented method, system, and computer program product for dynamically configuring a virtual private network (VPN) protocol of a VPN tunnel. A processor may analyze data activity associated with a first device, where the first device is connected to a second device using a VPN tunnel. The processor may compare the analyzed data activity to a set of policies for determining a VPN protocol to apply to the VPN tunnel. The processor may identify, based on the comparing, a first VPN protocol from a plurality of VPN protocols. The processor may apply the first VPN protocol to the VPN tunnel.

20 Claims, 7 Drawing Sheets

(56) References Cited

U.S. PATENT DOCUMENTS

| | | | | |
|---|---|---|---|---|
| 2015/0188949 A1* | 7/2015 | Mahaffey | ............ | H04L 41/0894 726/1 |
| 2018/0152977 A1* | 5/2018 | Baron | ................... | H04W 8/005 |
| 2021/0168138 A1* | 6/2021 | Paruchuri | ........... | H04L 63/0485 |
| 2022/0286911 A1* | 9/2022 | Howe | ................ | H04L 63/1425 |

OTHER PUBLICATIONS

"Dynamic VPNs with Pulse Secure Clients," https://www.juniper.net/documentation/us/en/software/junos/vpn-ipsec/topics/topic-map/security-dynamic-vpns-with-pulse-secure-clients.html, Jan. 13, 2021, printed Jul. 27, 2021, 55 pgs.

"Types of VPN and types of VPN Protocols," https://www.vpnoneclick.com/types-of-vpn-and-types-of-vpn-protocols/, printed Aug. 27, 2021, 4 pgs.

Bahnasse et al., "Study and evaluation of the high availability of a Dynamic Multipoint Virtual Private Network," https://www.researchgate.net/publication/277882842, Jul. 2015, 6 pgs.

Mell et al., "The NIST Definition of Cloud Computing," Recommendations of the National Institute of Standards and Technology, U.S. Department of Commerce, Special Publication 800-145, Sep. 2011, 7 pgs.

On Point, "Site-to-Site Hybrid VPN Configuration," https://www.onpointcorp.com/wp-content/uploads/2020/01/Hybrid-VPN.pdf, accessed Aug. 27, 2021, 9 pgs.

Parmenter, T., dynamic multipoint VPN (DMVPN), https://searchnetworking.techtarget.com/definition/dynamic-multipoint-VPN-DMVPN, printed Aug. 27, 2021, 4 pgs.

Tizazu et al., "Dynamic routing influence on secure enterprise network based on DMVPN," https://ieeexplore.ieee.org/stamp/stamp.jsp?tp=&arnumber=7993894, ICUFN 2017, pp. 756-759.

ul Abideen et al., "VPN Traffic Detection in SSL-Protected Channel," https://www.researchgate.net/publication/336883770, Security and Communication Networks, Oct. 2019, 26 pgs.

* cited by examiner

DYNAMIC VIRTUAL PRIVATE NETWORK PROTOCOL CONFIGURATION

BACKGROUND

The present disclosure relates generally to the field of computing networks and, more specifically, to dynamic virtual private network (VPN) protocol configuration of a VPN tunnel in network environments.

A VPN tunnel is an encrypted link between a computing device (e.g., computer, mobile device, remote device, etc.) and an outside network. A VPN tunnel is configured to cloak a user's online activity and prevent it from being viewed and/or tracked by another party/device. For example, a VPN tunnel may hide the computing device's IP address and encrypt any data generated and/or transmitted through the VPN tunnel. By connecting to websites and/or networks through a VPN tunnel and not through a direct connection, confidential data can be secured which prevents hackers or other nefarious snoops from tracking a user's online activity.

SUMMARY

Embodiments of the present disclosure include a computer-implemented method, system, and computer program product for dynamically configuring a virtual private network (VPN) protocol of a VPN tunnel. A processor may analyze data activity associated with a first device, wherein the first device is connected to a second device using a VPN tunnel. The processor may compare the analyzed data activity to a set of policies for determining a VPN protocol to apply to the VPN tunnel. The processor may identify, based on the comparing, a first VPN protocol from a plurality of VPN protocols. The processor may apply the first VPN protocol to the VPN tunnel.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
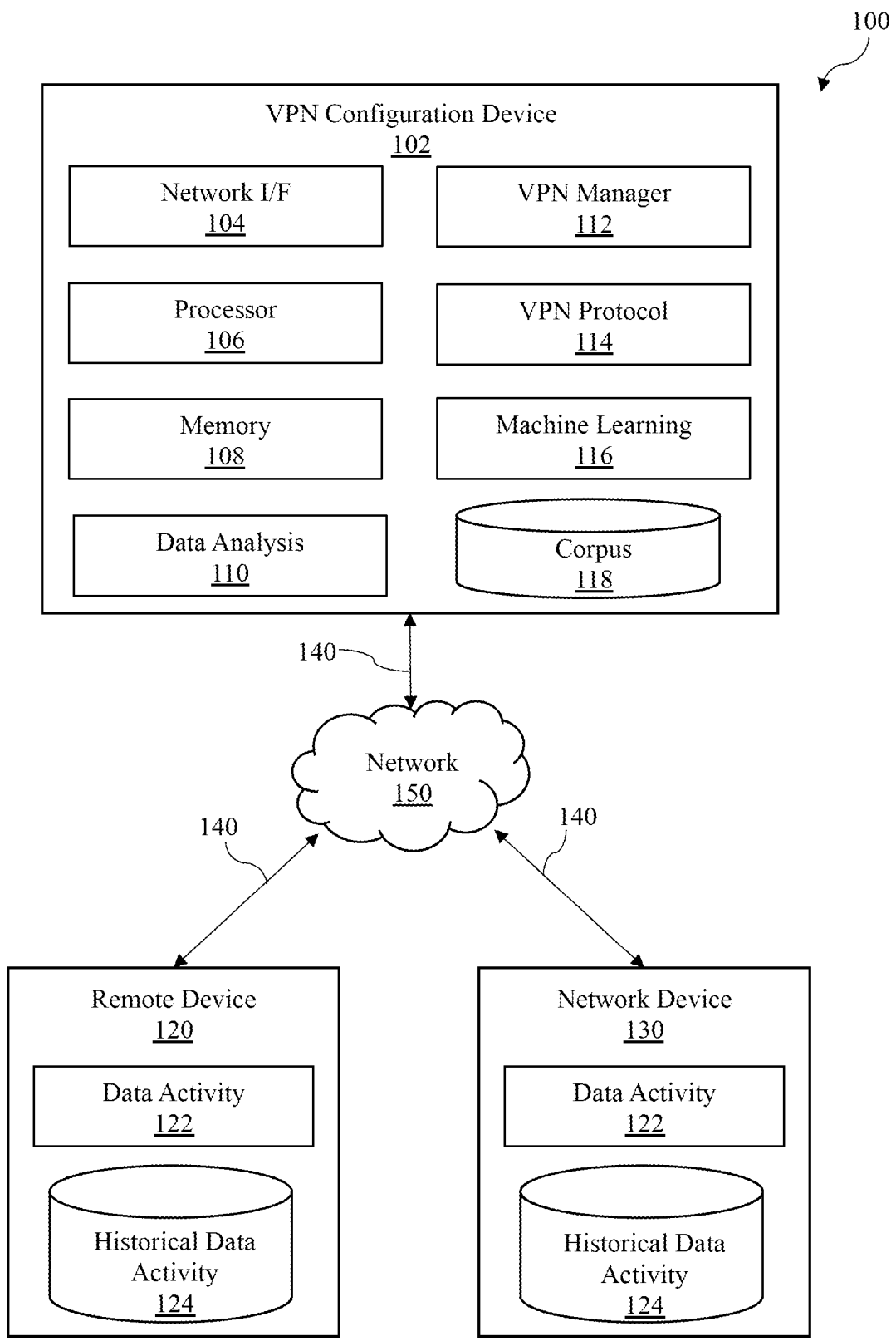
FIG. 1 illustrates a block diagram of an example VPN system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of computing networks and, more particularly, to dynamic/automated virtual private network (VPN) protocol configuration of a VPN tunnel in a hybrid cloud environment. While the present disclosure is not necessarily limited to such applications, various aspects of the disclosure may be appreciated through a discussion of various examples using this context.

A VPN allows a user to connect to a private network over the Internet securely and privately. A VPN creates an encrypted connection, known as VPN tunnel, and Internet traffic and communication is passed through this secure tunnel. Thus, keeping user data secure and private.

There are two types of VPNs that are used to encrypt data activity, a remote access VPN and a Site-to-Site VPN. A remote access VPN allows a user to connect to a private network and access its services and resources remotely. The connection between the user and the private network happens through the Internet and the connection is secure and private. A remote access VPN is useful for both business users as well as home users. A Site-to-Site VPN is mostly used in a corporate setting that requires a secure connection. For example, companies with offices in different geographical locations use a Site-to-Site VPN to connect the network of one office location to the network at another office location. When multiple offices of the same company are connected using Site-to-Site VPN, it is called as Intranet based VPN. When companies use Site-to-Site VPN type to connect to the office of another company, it is called as Extranet based VPN. A Site-to-Site VPN creates a virtual bridge between the networks at geographically distant offices and connects them through the Internet while maintaining a secure and private communication between the networks. Site-to-site VPN is based on Router-to-Router communication, where one router acts as a VPN Client and another router acts as a VPN Server. The communication between the two routers is initiated only after an authentication is validated between the two.

In hybrid cloud environments, the connections between the public cloud infrastructure, private cloud infrastructure, and various remote/network devices may use a combination of both remote VPN and Site-to-Site VPN that requires varying levels of encryption based on the types of data and/or data activities being performed over the network. Remote VPN and Site-to-Site VPN may utilize a VPN tunnel that uses a specific VPN protocol based on need. However, not all VPN tunnels are equally effective in protecting online privacy. The strength of the VPN tunnel depends on the type of VPN protocol used. Further, each VPN protocol may differ in bandwidth, costs, and data transfer time which is dependent on the encryption level of the VPN protocol that is applied. A description of various VPN protocols that may be applied to a VPN tunnel is provided below.

Internet Protocol Security (IPSec) is used to secure Internet communication across an IP network. IPSec secures Internet Protocol communication by authenticating the session and encrypts each data packet during the connection. IPSec operates in two modes, Transport mode and Tunneling mode, to protect data transfer between two different networks. The transport mode encrypts the message in the data packet and the tunneling mode encrypts the entire data packet. IPSec can also be used with other security protocols to enhance the security system.

Layer 2 Tunneling Protocol (L2TP) is a tunneling protocol that is usually combined with another VPN security protocol like IPSec to create a highly secure VPN connection. L2TP creates a VPN tunnel between two L2TP connection points and IPSec protocol encrypts the data and handles secure communication over the VPN tunnel.

Point-to-Point Tunneling Protocol (PPTP) creates a VPN tunnel and encapsulates the data packet. It uses a Point-to-Point Protocol (PPP) to encrypt the data between the connection. PPTP is one of the most widely used VPN protocols.

Secure Sockets Layer (SSL) and Transport Layer Security (TLS) create a VPN connection where a web browser acts as the client and user access is restricted to specific applications instead of entire network. SSL and TLS protocol is most commonly used by online shopping websites and service providers.

OpenVPN is an open source VPN that is useful for creating Point-to-Point and Site-to-Site connections. It uses a custom security protocol based on SSL and TLS protocol.

Secure Shell (SSH) creates the VPN tunnel through which the data transfer happens and also ensures that the tunnel is encrypted. SSH connections are created by a SSH client and data is transferred from a local port on to the remote server through the encrypted tunnel.

Typically, the VPN protocol that is applied to the VPN tunnel is dependent on the type of data being transmitted and/or the type of data activity being performed over the VPN connection. However, in many instances, the VPN protocol may not correlate appropriately to the required security/encryption level for the given data activity/data type. For example, a VPN tunnel may use a more secure (and costlier) VPN protocol for transmitting non-confidential/public data from a remote device to another device over a network than is necessary. Or alternatively, a VPN tunnel may be configured with a less secure VPN protocol for transferring confidential data that may be more easily decrypted by a hacker. In both instances, the appropriate VPN protocol is not being applied to the tunnel for the given data type and/or data activity.

Embodiments of the present disclosure include a system, computer-implemented method, and computer program product that are configured to analyze data activity being performed between devices that are using a VPN tunnel and dynamically apply an appropriate VPN protocol to the VPN tunnel based on the given data activity. In this way, the proper security/encryption level that correlates to the identified data activity will be automatically applied to the VPN tunnel. This allows various forms of confidential data to be sent over the network in the most secure way and additionally may save time and costs based on applying the most appropriate VPN protocol.

In embodiments, a VPN configuration device is configured to monitor data activity associated with a VPN system. The VPN system may be configured as any type of networking environment, such as a public cloud, private cloud, and/or hybrid cloud environment. In embodiments, the VPN system utilizes a secure VPN tunnel when performing data activities between network devices. For example, in a hybrid cloud environment, the public cloud and private cloud will be communicating through a secure VPN tunnel. Further, when a user accesses the hybrid cloud environment, the connection between the user's device (e.g., remote device) will also utilize VPN connectivity through a secure VPN tunnel.

The VPN configuration device may analyze the data activity associated with the VPN system and dynamically/automatically apply an appropriate VPN protocol to the VPN tunnel based on that data activity. For example, the VPN configuration device may identify that a user or automated device (e.g., using robotic automation) has connected to the network in order to upload confidential information to the private cloud. Based on the data activity (e.g., type of data, activity to be performed, location where the data is to be stored, etc.) the VPN configuration device identifies the appropriate VPN protocol (e.g., a VPN protocol having a higher security/encryption level for confidential information) for the VPN tunnel to ensure that the data is transmitted securely. Once the appropriate VPN protocol is identified, the VPN configuration device selects and automatically applies the VPN protocol to the VPN tunnel. In this way, the VPN protocol applied to the VPN tunnel correlates to the required security/encryption level needed for the given data activity.

In embodiments, the VPN configuration device may utilize various machine learning algorithms to detect and/or identify the type of data activity that is performed using the VPN tunnel and correlate the data activity to an appropriate VPN protocol. For example, the VPN configuration device may gather various historical data and/or historical data activities to predict an appropriate VPN protocol to be applied based on what type of protocol was used during previous VPN sessions. For example, the VPN configuration device may gather historical VPN connectivity logs, previous data activities performed using a given connected device, and/or the previous types of data being transmitted using a VPN tunnel on a given network. Using this historical data allows the VPN configuration device to make correlations/determinations on which VPN protocol is predicted to be applied for the respective data activity based on a required security level.

The VPN configuration device may use the determinations to generate a set of policies for applying various VPN protocols to the VPN tunnel. The set of policies may be determined based on a VPN protocol score that correlates to the security level needed for the specific data activity. The set of policies may be stored in a knowledge corpus that is accessible by a VPN manager of the VPN configuration device. The VPN manager may access the knowledge corpus to select the appropriate VPN protocol in response to a request for creation of a VPN tunnel. In some embodiments, the VPN manager may also receive an indication of the type of data activity is to be performed and select the VPN protocol accordingly.

In embodiments, the VPN manager may continuously track and/or monitor the data activity that is being performed using the VPN tunnel. If the VPN manager detects a change in the data activity (e.g., such as detecting a data activity that requires a higher or lower level of encryption), the VPN manager will automatically select a more or less secure VPN protocol based on comparing the change in the data activity to the set of polices stored in the knowledge corpus.

For example, the VPN manager may detect that a user has opened a real estate application on their mobile device in order to upload various confidential asset disclosures to a private cloud database. However, the current VPN protocol being applied to the VPN tunnel may only include a security level necessary for standard email operations and may not be secure enough to properly encrypt the asset disclosure data. Therefore, the VPN manager will automatically select a different VPN protocol that correlates to performing confidential asset disclosure activities according to the set of policies. Once selected, the VPN manager will dynamically apply the more secure VPN protocol to the VPN tunnel.

In some embodiments, a posture (security risk assessment) of each of the respective devices connected to the network using the VPN tunnel may be continuously monitored and used as an additional input when analyzing the data activity. The posture may include various security attributes of the device such as software versions, security certifications, encrypted data/encryption keys, and location (e.g., secure/unsecure location on the network) of the device. The posture may be supplied to the VPN manager to help in selecting the appropriate VPN protocol and/or used as an additional attribute when generating the set of policies that correlate to applying the VPN protocols to the VPN tunnel. In some embodiments, any change detected in the posture of the device may result in re-computation of the VPN protocol. For example, if the software version of a device is out of date (now less secure), this attribute may be used to re-compute/re-assess the current VPN protocol being applied to the VPN tunnel, and the VPN manager may change to a different VPN protocol with a more secure encryption level. In this way, if a device is determined to be a security risk, a higher level of encryption may be used to prevent hacking.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of VPN system 100, in accordance with embodiments of the present disclosure. In the illustrated embodiment, VPN system 100 includes VPN configuration device 102 that is communicatively coupled to remote device 120 and network device 130 via network 150. VPN configuration device 102, remote device 120, and network device 130 may be configured as any type of computer system and may be substantially similar to computer system 501 of FIG. 5. In embodiments, VPN configuration device 102, remote device 120, and network device 130 may communicate with each other over network 150 using VPN tunnel(s) 140. VPN tunnel 140 is configured to encrypt data activity using a VPN protocol 114 as determined by VPN configuration device 102.

Figure 2:
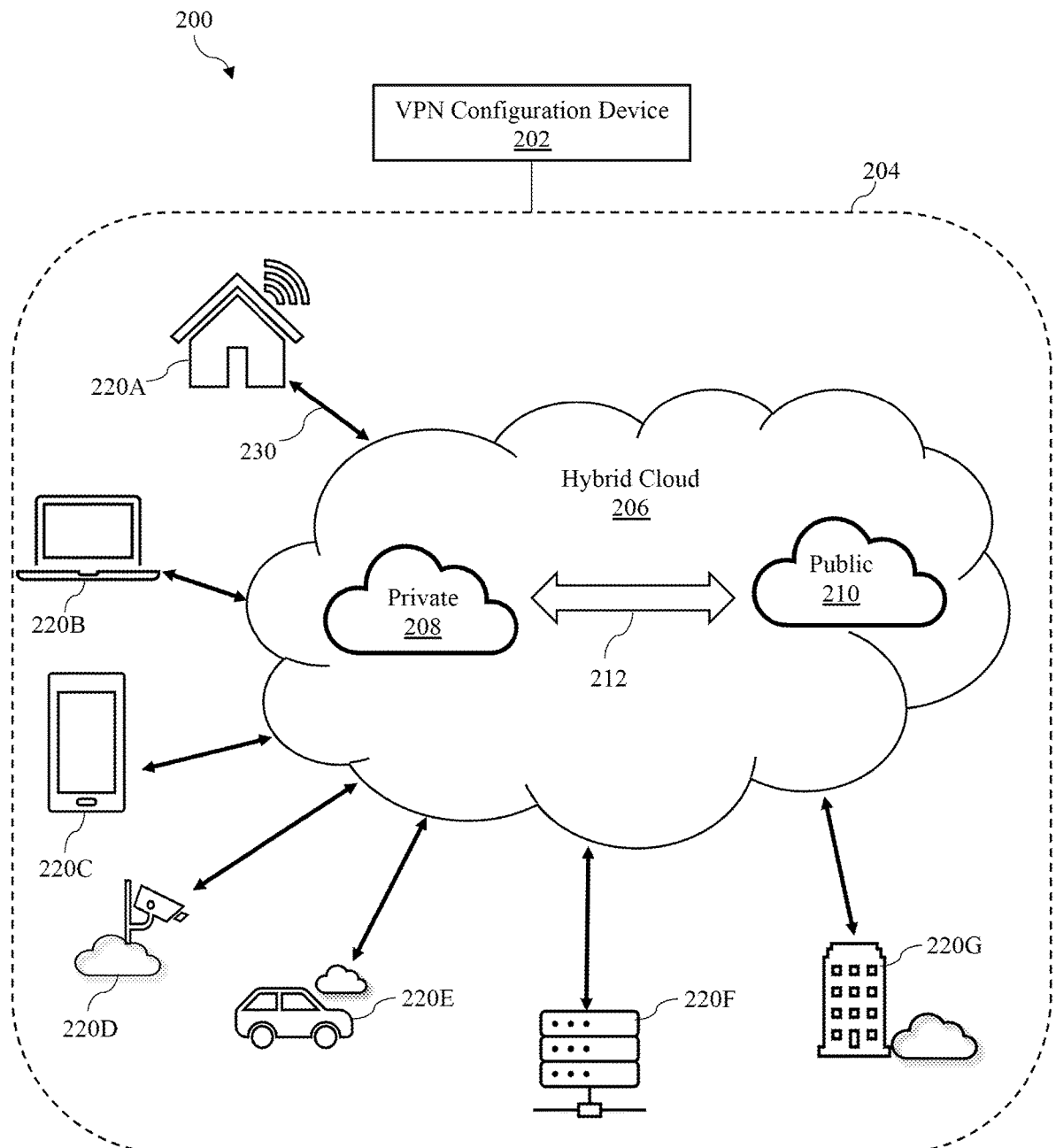
FIG. 2 illustrates a block diagram of an example VPN architecture, in accordance with embodiments of the present disclosure.

In embodiments, VPN configuration device 102, remote device 120, and network device 130 may be established within a VPN topology, such as VPN topology 204 as described in FIG. 2. For example, remote device 120 and network device 130 may be configured as remote or edge devices, network devices, and/or cloud devices such as an on-premises private cloud (e.g., within an organization's data center) or public cloud computing environment, where data activity 122 of the given devices can be monitored by VPN configuration device 102. VPN configuration device 102 is configured to analyze the data activity 122 in order to make determinations/predictions on what type of VPN protocol 114 to apply to a given VPN tunnel 140 connection.

In embodiments, network 150 may be any type of communication network, such as a wireless network, edge computing network, a cloud computing network, or any combination thereof (e.g., hybrid cloud network/environment). Network 150 may be substantially similar to, or the same as, VPN architecture 200 described in FIG. 2, and/or cloud computing environment 50 described in FIG. 6. Consistent with various embodiments, a VPN architecture and a cloud computing environment may include a network-based, distributed data processing system that provides one or more edge/network/cloud computing services. Further, a VPN architecture and/or cloud computing environment may include many computers (e.g., hundreds or thousands of computers or more) disposed within one or more data centers and configured to share resources over network 150.

In some embodiments, network 150 can be implemented using any number of any suitable communications media. For example, the network may be a wide area network (WAN), a local area network (LAN), a personal area network (PAN), an internet, or an intranet where the communicatively coupled devices are connected using a VPN tunnel 140. In certain embodiments, the various systems may be local to each other, and communicate via any appropriate local communication medium. For example, VPN configuration device 102 may communicate with remote device 120 and network device 130 through VPN tunnel 140 using a WAN, one or more hardwire connections (e.g., an Ethernet cable), and/or wireless communication networks. In some embodiments, the various systems may be communicatively coupled using a combination of one or more networks and/or one or more local connections. For example, in some embodiments VPN configuration device 102 may communicate with network device 130 using a hardwired connection, while communication between remote device 120 and VPN configuration device 102 may be through a wireless communication network.

In embodiments, remote device 120 and network device 130 may be any type of computing devices that generate data activity 122. For example, remote device 120 may be configured as a desktop, laptop, smartphone, smart camera, smart car, while network device may be configured as a server, website, database, another remote device, etc. It is noted these remote device and network device examples are not meant to be limiting.

Data activity 122 may comprise any type of data or activity that can be used by VPN configuration device 102 to determine what type of VPN protocol 114 to apply to VPN tunnel 140. For example, data activity 122 may include contextual data/metadata indicating what type(s) of data is/are being transmitted between remote device 120 and network device 130 using VPN tunnel 140. Historical data activity 124 comprises previous data activity that has been performed using VPN tunnel 140 by remote device 120 or network device 130 in previous VPN sessions.

In the illustrated embodiment, VPN configuration device 102 includes network interface (I/F) 104, processor 106, memory 108, data analysis component 110, VPN manager 112, VPN protocol 114, machine learning component 116, and corpus 118. In embodiments, remote device 120 and network device 130 may also contain similar components (e.g., processors, memories, network I/F, analysis components, etc.) as VPN configuration device 102; however, for brevity purposes these components are not shown.

In embodiments, VPN configuration device 102 is configured to receive, collect, monitor, and/or analyze data activity 122 from remote device 120 and/or network device 130. In embodiments, VPN configuration device 102 may be located on network 150 (e.g., located on a server or cloud network, etc.) or a standalone device that connects to the network 150 via VPN tunnel 140.

In embodiments, data analysis component 110 is configured to perform analytics processing on data activity 122 that is generated by remote device 120 and/or network device 130. Data analysis component 110 may make determinations on what type of data activity (e.g., by analyzing various metadata, inference data, texts, image data, and/or contextual data) is being or will be performed (via user's request for VPN connectivity) using VPN tunnel 140. For example, data activity 122 may comprise various data types indicating that confidential information (e.g., financial information, social security numbers, intellectual property information, etc.) will be transmitted using the VPN tunnel. Based on the analyzed data activity 122, the VPN configuration device 102 can make determinations for applying an appropriate VPN protocol that has a security level (e.g., encryption level) that correlates to the data being transmitted using the VPN tunnel. For example, a first data activity may correlate to a first VPN protocol that has a first security level (e.g., low encryption level), while a second data activity may correlate to a second VPN protocol having a second security level (e.g., high encryption level). In another example, the analyzed data activity 122 may include a location of where the data to be transmitted will be stored/accessed, such as whether it will be accessed from a private or public cloud network. Using the location, the VPN configuration device 102 can appropriately apply an applicable VPN protocol depending on the required security level of the location (e.g., private cloud may have a higher level of security than a public cloud infrastructure).

In embodiments, the data analysis component 110 may use and/or operate in conjunction with machine learning component 116 when analyzing data activity 122 that is generated from remote device 120 and network device 130. For example, various machine learning techniques (e.g., optical character recognition (OCR), natural language processing (NLP), image recognition algorithms, etc.) may be used in conjunction with data analysis component 110 to determine the type of data activity 122 is being performed using the VPN tunnel 140.

In embodiments, VPN manager 112 is configured to implement a set of policies related to which VPN protocol 114 to apply to VPN tunnel 140 based on the analyzed data activity 122. The set of policies are stored in knowledge corpus 118 where VPN manager 112 may access them. The VPN manager 112 selects the appropriate VPN protocol 114 to apply to the VPN tunnel 140 by comparing the analyzed data activity 122 to the set of policies. VPN protocol 114 may be any type of encryption protocol that can be applied to VPN tunnel 140. VPN protocol may include one of the following protocols: Internet Protocol Security (IPSec), Layer 2 Tunneling Protocol (L2TP), Point-to-Point Tunneling Protocol (PPTP), Secure Sockets Layer (SSL), Transport Layer Security (TLS), OpenVPN, or Secure Shell (SSH). It is noted that other types of VPN protocols may be applied to the VPN tunnel and that this list is not meant to be limiting.

Machine learning component 116 may generate the set of policies for implementing a specific VPN protocol 114 that correlates to the given data activity 122 being performed using VPN tunnel 140. Machine learning component 116 may generate the set of policies by analyzing historical data activities 124 to extract information on how to manage and implement appropriate VPN protocols 114 that have been historically used by the given devices. These policies may be based on analyzing historical VPN connectivity logs, previous activities performed using VPN connectivity, and/or various types of data handled by the device. The machine learning component 116 may use various machine learning techniques such as multi-classification algorithms to analyze the historical data activity 124.

Machine learning component 116 can utilize machine learning and/or deep learning, where algorithms or models can be generated by performing supervised, unsupervised, or semi-supervised training on historical data activity 124 to improve the accuracy of determining an appropriate VPN protocol 114 to apply to the VPN tunnel 140. For example, the machine learning component 116 may determine over time that a first VPN protocol that was initially applied to the VPN tunnel 140 for a first type of data is not secure enough based on updated historical data activity (e.g., identifying that a user manually changed the first VPN protocol to a second VPN protocol that is more secure). Accordingly, the machine learning component 116 may automatically update the set of policies for implementing the second VPN protocol 114 when transmitting the first type of data using the VPN tunnel 140.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

FIG. 1 is intended to depict the representative major components of data content management system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown within storage system 100 may not be present, and the arrangement of components may vary.

For example, while FIG. 1 illustrates an example VPN system 100 having a single VPN configuration device 102, a single remote device 120, and a single network device 130 that are communicatively coupled via a single network 150, suitable network architectures for implementing embodiments of this disclosure may include any number of VPN systems, VPN configuration devices, remote devices, network devices, and networks. The various models, modules, systems, and components illustrated in FIG. 1 may exist, if at all, across a plurality of VPN systems, VPN configuration devices, remote devices, network devices, and networks. For example, the components of the VPN configuration device 102 may exist within the remote device 120 instead of being a standalone device.

Referring now to FIG. 2, shown is an example VPN architecture 200, in accordance with embodiments of the present disclosure. In the illustrated embodiment, VPN configuration device 202 is communicatively connected to VPN topology 204. In embodiments, VPN configuration device 202 may be substantially similar to VPN configuration device 102 described in FIG. 1. VPN topology 204 includes hybrid cloud environment 206 which is communicatively coupled to remote device 220A-220G (collectively referred to as remote devices 220) via VPN tunnel 230 (shown as double sided arrows). Hybrid cloud environment 206 includes private cloud 208 and public cloud 210 which are communicatively coupled via VPN tunnel 212. In embodiments, hybrid cloud environment 206, private cloud 208, and public cloud 210 may be substantially similar to cloud computing environment 50 described in FIG. 6.

In the illustrated embodiment, the VPN configuration device 202 continuously monitors the data activity between the remote devices 220 and the hybrid cloud environment 206 and applies an appropriate VPN protocol to the VPN tunnel 230 based on the given data activity. For example, remote device 220A may communicate directly with private cloud 208 using VPN tunnel 230. VPN configuration device 202 may monitor remote device 220A's data activity and identify that a user is attempting to upload secure documents to the private cloud 208. The data activity may include various contextual data that indicates the security level of the documents such as metadata tags, headers, textual content; prior logins of the user on the remote device 220A when accessing private cloud 208; and the location of where the data is to be uploaded. Using this data activity, the VPN configuration device 202 may compare the given data activity to a set of policies for selecting the appropriate VPN protocol to apply. Once the appropriate VPN protocol is selected for the data activity, the VPN configuration device 202 will automatically/dynamically apply the appropriate VPN protocol to the VPN tunnel 230 that corresponds the appropriate security level for transmitting the data.

In embodiments, the VPN configuration device 202 may detect a change in the data activity associated with remote device 220A and based on the change in data activity, may apply a different VPN protocol to the VPN tunnel 230. For example, a user may cease connection to private cloud 208 and request a new VPN tunnel 230 connection corresponding to remote device 220C. For example, the user may be sending pictures or some other image data from remote device 220A to the user's mobile device (remote device 220C). The VPN configuration device 202 may identify the change in the data activity and analyze the given contextual data. For example, the VPN configuration device 202 may analyze the image data to be sent over the VPN tunnel, any associated contextual data, and/or prior historical data activity related to sending image data by the user to the user's mobile device. The VPN configuration device 202 compares the analysis of the data activity to a set of policies for applying the appropriate VPN protocol to the VPN tunnel 230, and applies the selected protocol that matches the data activity.

In some embodiments, the VPN configuration device 202 may monitor and/or identify various automated/scheduled data activities and apply the appropriate VPN protocol based on the automated scheduled activity. For example, the VPN configuration device 202 may identify that that remote device 220G (e.g., an automated financial institution device) automatically performs data processing/data backup corresponding to remote device 220F (e.g., secure data server located on hybrid cloud 206) on a weekly basis. However, the data processing/data backup activities may require a more secure level of data encryption than normal daily activities performed using remote device 220G. Therefore, the VPN configuration device 202 may automatically switch from a less secure VPN protocol that is being applied daily to a more secure VPN protocol when the scheduled data activities are to take place on remote device 220F.

In this way, the VPN configuration device 202 continuously monitors and applies the appropriate VPN protocol to the VPN tunnel based on the current data activity being performed for the given remote devices. Because each VPN protocol offers different features and levels of security during VPN connection, and different types of activities need different types of features and levels of security with the selected VPN connection, the VPN configuration device 202 is configured to dynamically choose the correct VPN protocol to apply.

Figure 3:
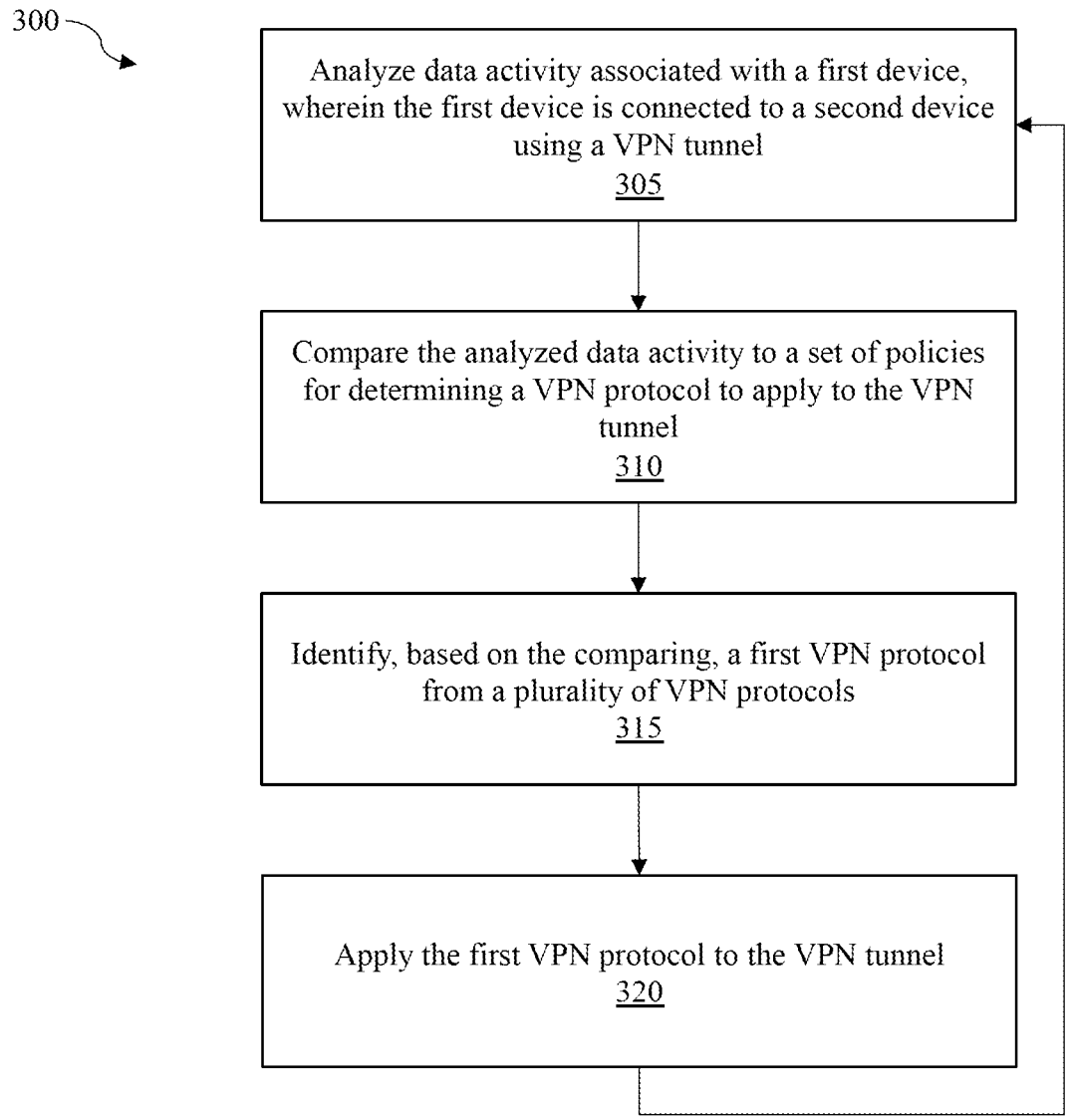
FIG. 3 illustrates a flow diagram of an example process for dynamically configuring a VPN protocol of a VPN tunnel based on data activity, in accordance with embodiments of the present disclosure.

Referring now to FIG. 3, shown is a flow diagram of an example process 300 for dynamically configuring a VPN protocol of a VPN tunnel based on data activity, in accordance with embodiments of the present disclosure.

The process 300 may be performed by processing logic that comprises hardware (e.g., circuitry, dedicated logic, programmable logic, microcode, etc.), software (e.g., instructions run on a processor), firmware, or a combination thereof. In some embodiments, the process 300 is a computer-implemented process. In embodiments, the process 300 may be performed by processor 106 of VPN configuration device 102 exemplified in FIG. 1.

The process 300 begins by analyzing data activity associated with a first device, wherein the first device is connected to a second device using a VPN tunnel. This is illustrated at step 305. For example, the first device may be a remote laptop that is connected to a network device, such as a cloud server or another remote device, via a VPN tunnel.

The data activity indicates what type of data, internet activity, data processing, etc., will be performed using the VPN tunnel. The data activity can be determined from various contextual data associated with the first device and/or the second device. For example, the data activity may include various metadata/contextual data that indicate a type of data being transmitted using the VPN tunnel, a type of activity being performed with the data (e.g., uploading/download confidential data), login credentials associated with the first device (e.g., secure logins for dealing with sensitive data), data traffic and network bandwidth associated with the VPN tunnel; a location of data being transmitted using the VPN tunnel, types of software applications on the first device that will use the VPN tunnel, and/or a posture of the first device.

The data activity may be analyzed using various machine learning techniques in order to identify what type of data activity is being/will be performed using the VPN tunnel. For example, the VPN configuration device may utilize image recognition techniques such as object character recognition (OCR) and/or natural language processing (NLP) to determine what types of data and/or data activity are being transmitted/performed using the VPN tunnel. For example, the VPN configuration device may identify various bank account numbers and/or bank identification characters (e.g., terms such as bank statement, financial institution names, etc.) to determine the first device is transmitting financial information using the VPN tunnel. In another example, the VPN configuration device may use image recognition to identify various types of medical images (e.g., X-rays, CT scans, etc.) to determine the first device is transmitting sensitive medical imaging data.

The process 300 continues by comparing the analyzed data activity to a set of policies for determining a VPN protocol to apply to the VPN tunnel. This is illustrated at step 310. In embodiments, the set of policies are based upon historical data activities related to the first device, where each policy of set of policies correlates to applying a specific VPN protocol based on a security level required for a given data activity. For example, a first data activity may correlate to a first VPN protocol that has a first security level (e.g., low encryption level), while a second data activity may correlate to a second VPN protocol having a second security level (e.g., high encryption level). Returning to the data activity examples above, a first policy for transmitting financial information may require a first VPN protocol having a medium security level requirement, while a second policy for transmitting sensitive medical images may require a second VPN protocol having a high security level requirement.

The process 300 continues by identifying, based on the comparing, a first VPN protocol from a plurality of VPN protocols. This is illustrated at step 315. Returning to the previous example, if the given data activity is determined to be transmitting financial information, the VPN configuration device will automatically select the first VPN protocol having a medium security level requirement. The process 300 continues by applying the first VPN protocol to the VPN tunnel. This is illustrated at step 320.

In embodiments, the process 300 may return to step 305 and continuously monitor/analyze the data activity. In embodiments, the process 300 may proceed to process 400 if a change in data activity is detected. Process 400 is detailed in FIG. 4 below.

Figure 4:
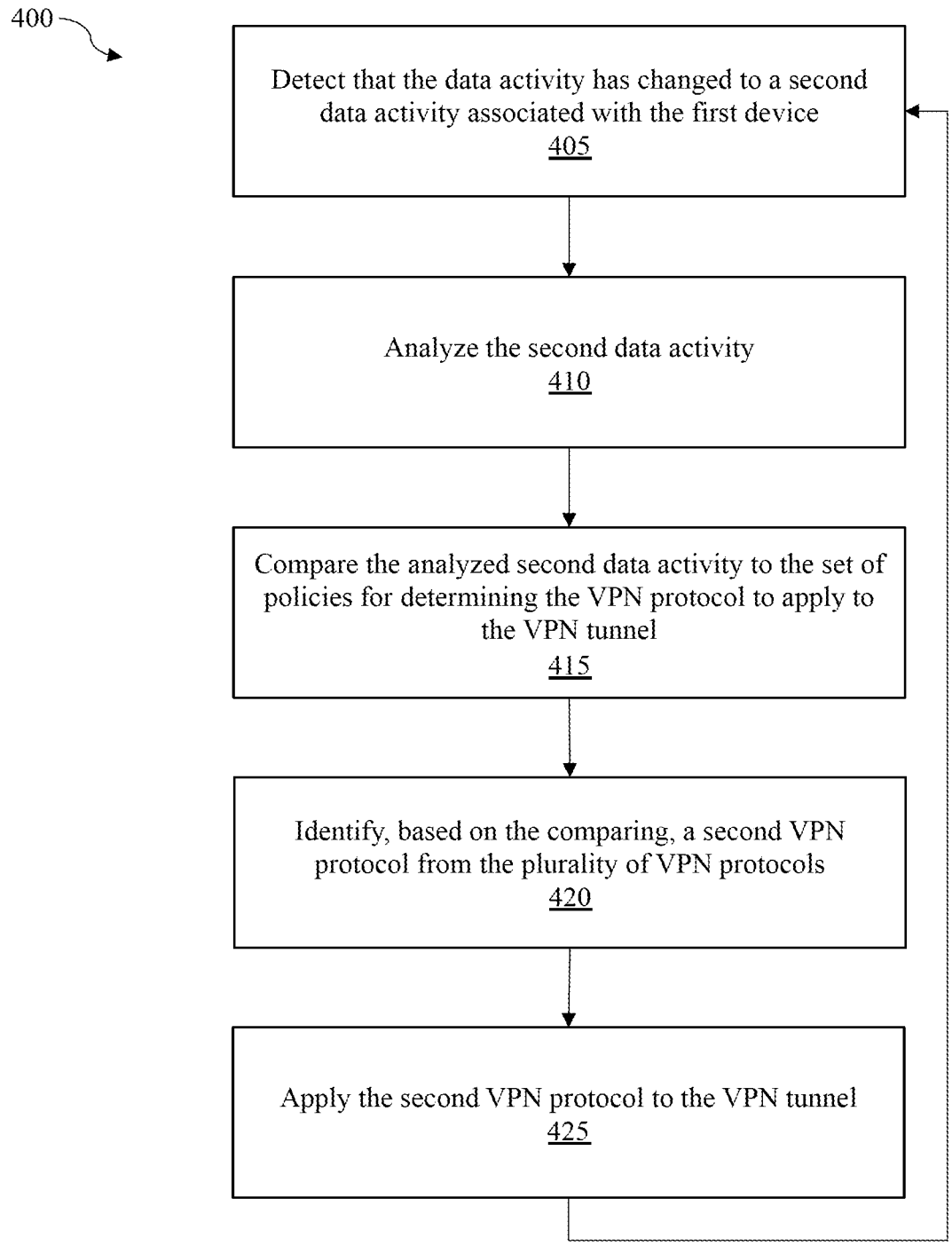
FIG. 4 illustrates a flow diagram of an example process for dynamically configuring a second VPN protocol of a VPN tunnel based on a change in data activity, in accordance with embodiments of the present disclosure.

Referring now to FIG. 4, shown is a flow diagram of an example process 400 for dynamically configuring a second VPN protocol of a VPN tunnel based on a change in data activity, in accordance with embodiments of the present disclosure.

The process 400 may be performed by processing logic that comprises hardware (e.g., circuitry, dedicated logic, programmable logic, microcode, etc.), software (e.g., instructions run on a processor), firmware, or a combination thereof. In some embodiments, the process 400 is a computer-implemented process. In embodiments, the process 400 may be in addition to or a subset of process 300. In embodiments, the process 400 may be performed by processor 106 of VPN configuration device 102 exemplified in FIG. 1.

The process 400 begins by detecting that the (first) data activity has changed to a second data activity associated with the first device. This is illustrated at step 405. Returning to the examples above, the VPN configuration device may detect that a user has closed a financial application and has opened a healthcare application on the first device in order to upload medical images to a private cloud server.

The process 400 continues by analyzing the second data activity. This is illustrated at step 410. Returning to the example above, the VPN configuration device may analyze the second data activity (e.g., identifying the health application is open, a user request to create a secure connection, identifying the medical images, etc.) to identify that the second data activity requires a different VPN protocol based on the change in the activity.

The process 400 continues by comparing the analyzed second data activity to the set of policies for determining the VPN protocol to apply to the VPN tunnel. This is illustrated at step 415. The process 400 continues by identifying, based on the comparing, a second VPN protocol from the plurality of VPN protocols. This is illustrated at step 420. Returning to the example above, the system may compare the second data activity to the set of policies and determine that the second policy for transmitting sensitive medical images require a second VPN protocol having a high security level requirement.

The process 400 continues by applying the second VPN protocol to the VPN tunnel. This is illustrated at step 425. In this way, the VPN configuration device automatically applies the appropriate VPN protocol based on the security level required for the second data activity. Once the second VPN protocol is applied to the VPN tunnel, the process 400 may return to step 405 to monitor any further changes in data activity.

Figure 5:
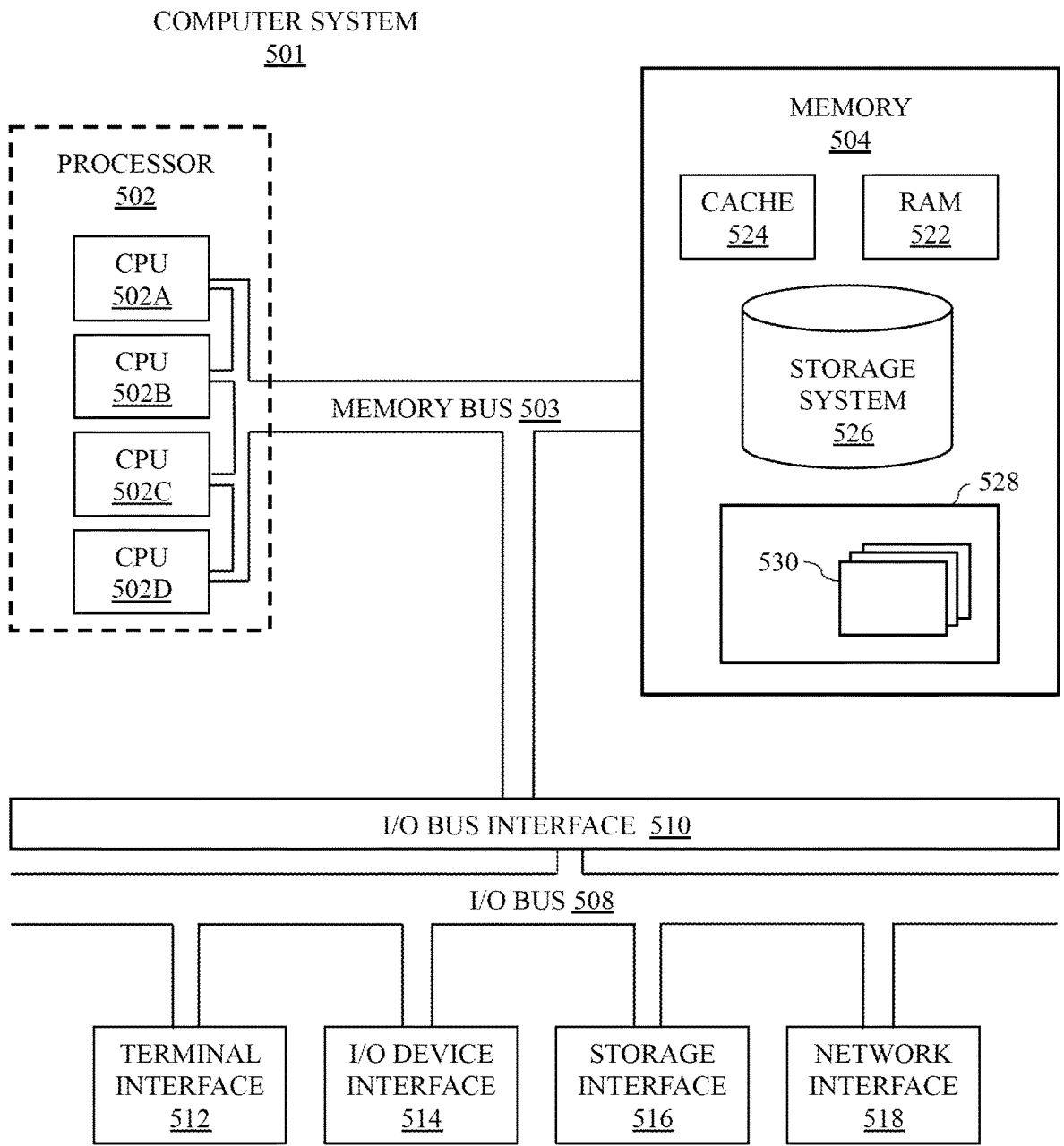
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache. In some embodiments, a processor can include at least one or more of, a memory controller, and/or storage controller. In some embodiments, the CPU can execute the processes included herein (e.g., processes 300 and 400 as described in FIG. 3 and FIG. 4, respectively). In some embodiments, the computer system 501 may be configured as VPN system 100 of FIG. 1.

System memory subsystem 504 may include computer system readable media in the form of volatile memory, such as random-access memory (RAM) 522 or cache memory 524. Computer system 501 may further include other removable/non-removable, volatile/non-volatile computer system data storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 504 can include flash memory, e.g., a flash memory stick drive or a flash drive. Memory devices can be connected to memory bus 503 by one or more data media interfaces. The memory subsystem 504 may include at least one program product having a set (e.g., at least one) of program modules that are configured to carry out the functions of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single units, the computer system 501 may, in some embodiments, contain multiple I/O bus interfaces 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

One or more programs/utilities 528, each having at least one set of program modules 530 may be stored in memory subsystem 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 528 and/or program modules 530 generally perform the functions or methodologies of various embodiments.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various search servers through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
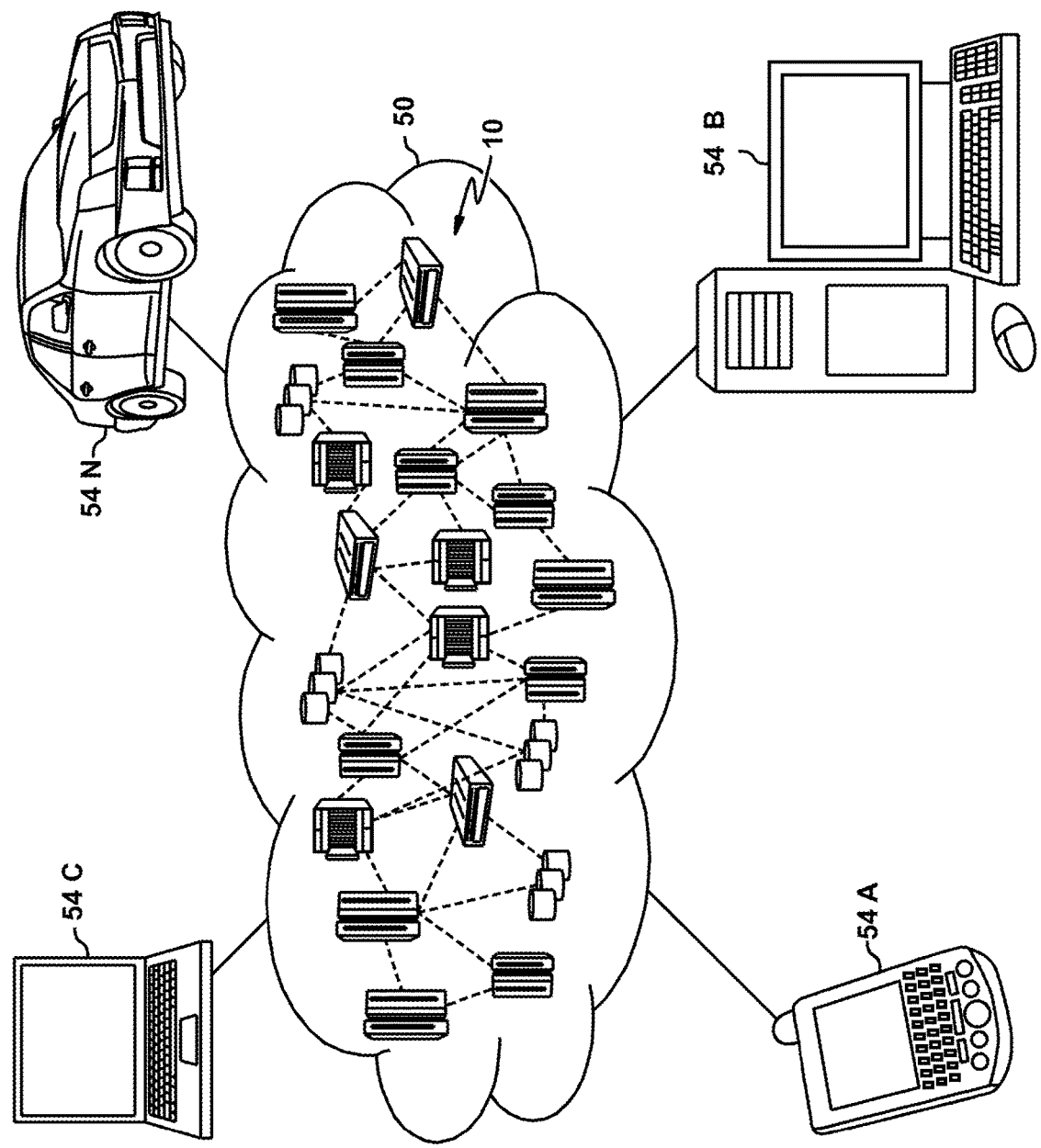
FIG. 6 depicts a cloud computing environment in accordance with embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
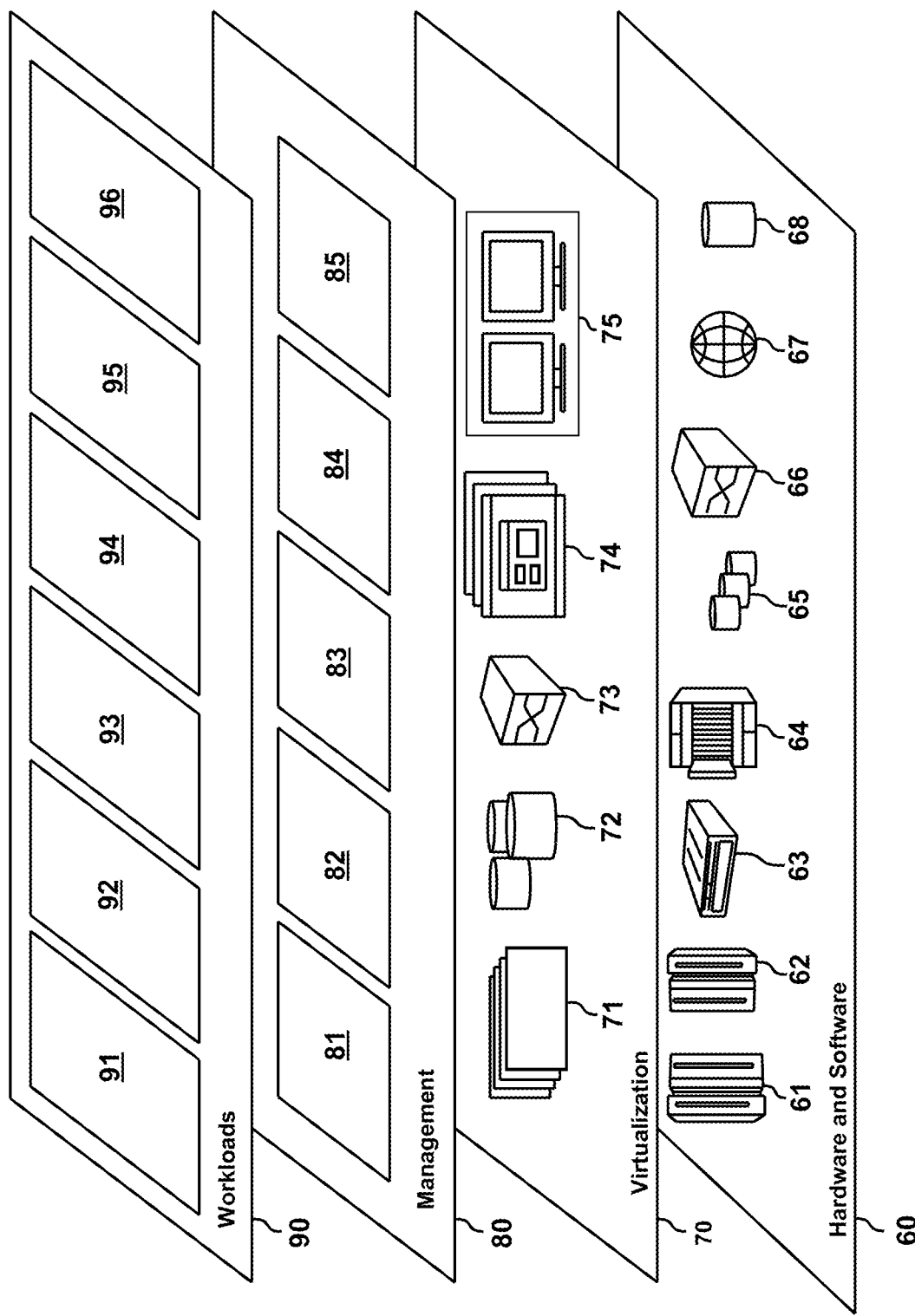
FIG. 7 depicts abstraction model layers in accordance with embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and VPN management software 68 in relation to the VPN system 100 of FIG. 1.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and VPN management and processing 96. For example, VPN system 100 of FIG. 1 may be configured to manage VPNs and/or apply VPN protocols using workloads layer 90.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method for dynamically configuring a virtual private network (VPN) protocol of a VPN tunnel, the method comprising:
    analyzing data activity associated with a first device, wherein the first device is connected to a second device using a VPN tunnel;
    comparing the analyzed data activity to a set of policies for determining a VPN protocol to apply to the VPN tunnel;
    identifying, based on the comparing, a first VPN protocol from a plurality of VPN protocols;
    applying the first VPN protocol to the VPN tunnel; and
    continuously monitoring the data activity for a change indicative of a requirement to apply a different VPN protocol to the VPN tunnel.

2. The computer-implemented method of claim 1, further comprising:
    identifying a change in the data activity to a second data activity associated with the first device;
    analyzing the second data activity;
    comparing the analyzed second data activity to the set of policies for determining the VPN protocol to apply to the VPN tunnel;
    identifying, based on the comparing, a second VPN protocol from the plurality of VPN protocols; and
    applying the second VPN protocol to the VPN tunnel.

3. The computer-implemented method of claim 1, wherein each policy of set of policies correlates to applying a specific VPN protocol based on a security level required for a given data activity.

4. The computer-implemented method of claim 1, wherein analyzing the data activity comprises analyzing one or more data activity chosen from the group consisting of:
    a type of data being transmitted using the VPN tunnel;
    a type of activity being performed with the data;
    a login credential associated with the first device;
    data traffic and network bandwidth associated with the VPN tunnel; and
    a location of data being transmitted using the VPN tunnel.

5. The computer-implemented method of claim 1, wherein the set of policies are based upon applying historical VPN protocols to historical data activities related to the first device.

6. The computer-implemented method of claim 1, wherein analyzing the data activity associated with the first device further comprises determining a posture of the first device.

7. The computer-implemented method of claim 6, wherein the posture comprises one or more security attributes and a location of the first device.

8. The computer-implemented method of claim 7, further comprising:
    detecting a change in the posture of the first device; and
    re-analyzing, based on detecting the change in posture, the configuration of the VPN protocol.

9. The computer-implemented method of claim 1, wherein the plurality of VPN protocols comprises two or more VPN protocols from the group consisting of:
    Internet Protocol Security (IPSec);
    Layer 2 Tunneling Protocol (L2TP);
    Point-to-Point Tunneling Protocol (PPTP);
    Secure Sockets Layer (SSL);
    Transport Layer Security (TLS);

Open VPN; and

Secure Shell (SSH).

10. The computer-implemented method of claim 1, wherein analyzing the data activity associated with the first device is performed using machine learning.

11. A system comprising:

a processor; and a computer-readable storage medium communicatively coupled to the processor and storing program instructions which, when executed by the processor, cause the processor to perform a method comprising:

analyzing data activity associated with a first device, wherein the first device is connected to a second device using a VPN tunnel;

comparing the analyzed data activity to a set of policies for determining a VPN protocol to apply to the VPN tunnel;

identifying, based on the comparing, a first VPN protocol from a plurality of VPN protocols;

applying the first VPN protocol to the VPN tunnel; and continuously monitoring the data activity for a change indicative of a requirement to apply a different VPN protocol to the VPN tunnel.

12. The system of claim 11, wherein the method performed by the processor further comprises:

identifying a change in the data activity to a second data activity associated with the first device;

analyzing the second data activity;

comparing the analyzed second data activity to the set of policies for determining the VPN protocol to apply to the VPN tunnel;

identifying, based on the comparing, a second VPN protocol from the plurality of VPN protocols; and applying the second VPN protocol to the VPN tunnel.

13. The system of claim 11, wherein each policy of set of policies correlates to applying a specific VPN protocol based on a security level required for a given data activity.

14. The system of claim 11, wherein analyzing the data activity comprises analyzing one or more data activity chosen from the group consisting of:

a type of data being transmitted using the VPN tunnel;

a type of activity being performed with the data;

a login credential associated with the first device;

data traffic and network bandwidth associated with the VPN tunnel; and a location of data being transmitted using the VPN tunnel.

15. The system of claim 11, wherein the set of policies are based upon applying historical VPN protocols to historical data activities related to the first device.

16. A computer program product comprising a computer-readable storage medium having program instructions embodied therewith, the program instructions executable by a processor to cause the processor to perform a method comprising:

analyzing data activity associated with a first device, wherein the first device is connected to a second device using a VPN tunnel;

comparing the analyzed data activity to a set of policies for determining a VPN protocol to apply to the VPN tunnel;

identifying, based on the comparing, a first VPN protocol from a plurality of VPN protocols;

applying the first VPN protocol to the VPN tunnel; and continuously monitoring the data activity for a change indicative of a requirement to apply a different VPN protocol to the VPN tunnel.

17. The computer program product of claim 16, wherein the method performed by the processor further comprises:

identifying a change in the data activity to a second data activity associated with the first device;

analyzing the second data activity;

comparing the analyzed second data activity to the set of policies for determining the VPN protocol to apply to the VPN tunnel;

identifying, based on the comparing, a second VPN protocol from the plurality of VPN protocols; and applying the second VPN protocol to the VPN tunnel.

18. The computer program product of claim 16, wherein each policy of set of policies correlates to applying a specific VPN protocol based on a security level required for a given data activity.

19. The computer program product of claim 16, wherein analyzing the data activity comprises analyzing one or more data activity chosen from the group consisting of:

a type of data being transmitted using the VPN tunnel;

a type of activity being performed with the data;

a login credential associated with the first device;

data traffic and network bandwidth associated with the VPN tunnel; and a location of data being transmitted using the VPN tunnel.

20. The computer program product of claim 16, wherein the set of policies are based upon applying historical VPN protocols to historical data activities related to the first device.

\* \* \* \* \*